United States Patent
Son et al.

(10) Patent No.: US 7,456,893 B2
(45) Date of Patent: Nov. 25, 2008

(54) METHOD OF CONTROLLING DIGITAL IMAGE PROCESSING APPARATUS FOR EFFICIENT REPRODUCTION AND DIGITAL IMAGE PROCESSING APPARATUS USING THE METHOD

(75) Inventors: Hyuk-soo Son, Seongnam-si (KR); Sung-ho Eun, Seongnam-si (KR)

(73) Assignee: Samsung Techwin Co., Ltd., Changwon (KR)

(*) Notice: Subject to any disclaimer, the term of this patent is extended or adjusted under 35 U.S.C. 154(b) by 597 days.

(21) Appl. No.: 11/167,851

(22) Filed: Jun. 27, 2005

(65) Prior Publication Data
US 2006/0209203 A1    Sep. 21, 2006

(30) Foreign Application Priority Data
Mar. 15, 2005    (KR) ............... 10-2005-0021335

(51) Int. Cl.
    *H04N 5/222* (2006.01)
(52) U.S. Cl. .................. 348/333.11; 348/333.01
(58) Field of Classification Search ............ 348/211.13, 348/333.01, 333.05, 333.11, 333.13
    See application file for complete search history.

(56) References Cited

U.S. PATENT DOCUMENTS

| 6,512,548 | B1 * | 1/2003 | Anderson ............ 348/333.05 |
| 6,867,807 | B2 * | 3/2005 | Malloy Desormeaux ......... 348/333.13 |
| 6,970,200 | B2 * | 11/2005 | Boll .................... 348/333.13 |
| 2004/0008970 | A1 * | 1/2004 | Junkersfeld et al. ........... 386/69 |
| 2004/0109063 | A1 * | 6/2004 | Kusaka et al. ............ 348/207.1 |
| 2004/0119876 | A1 | 6/2004 | Ohmori et al. |
| 2005/0134708 | A1 * | 6/2005 | Lee et al. ................ 348/240.2 |

FOREIGN PATENT DOCUMENTS

| JP | 11-331739 A | 11/1999 |
| JP | 2000-078518 A | 3/2000 |
| JP | 2004-112708 A | 4/2004 |
| KR | 1998-0071372 A | 10/1998 |

* cited by examiner

*Primary Examiner*—David Ometz
*Assistant Examiner*—Gary C Vieaux
(74) *Attorney, Agent, or Firm*—Drinker Biddle & Reath LLP

(57) ABSTRACT

Provided is a method of controlling a digital image processing apparatus that processes and stores an input image in a recording medium and reproduces files stored in the recording medium in a stored-image display mode. The method includes: (a) classifying the stored-image display mode into first and second modes; (b) determining whether any one of the first and second modes was selected by a user if a command to perform the stored-image display mode is input by the user; (c) displaying a latest file first if the first mode was selected; and (d) displaying a file most recently reproduced first if the second mode was selected.

16 Claims, 7 Drawing Sheets

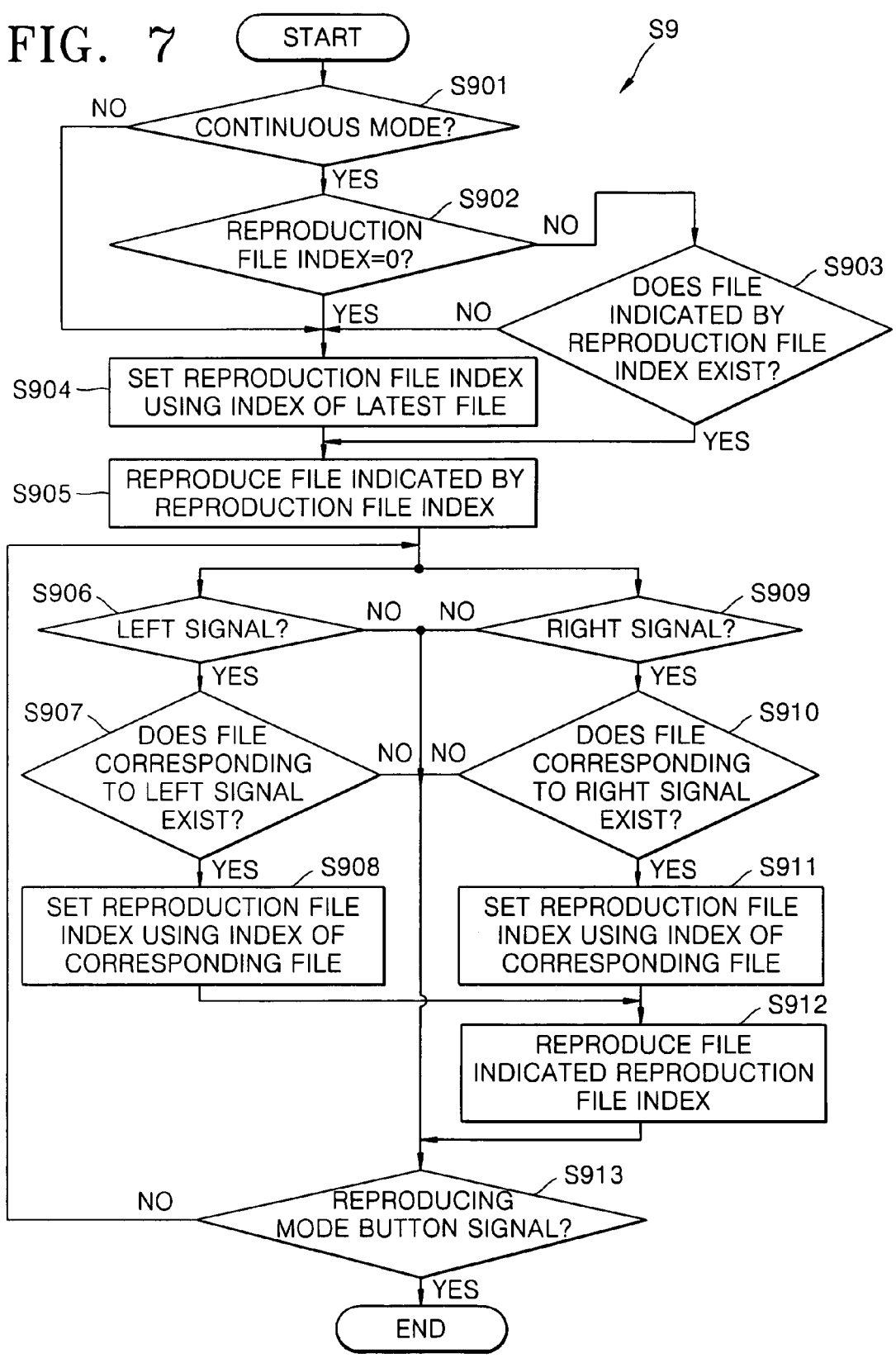

METHOD OF CONTROLLING DIGITAL IMAGE PROCESSING APPARATUS FOR EFFICIENT REPRODUCTION AND DIGITAL IMAGE PROCESSING APPARATUS USING THE METHOD

CROSS-REFERENCE TO RELATED PATENT APPLICATIONS

This application claims the priority of Korean Patent Application No. 10-2005-0021335, filed on Mar. 15, 2005, in the Korean Intellectual Property Office, the disclosure of which is incorporated herein in its entirety by reference.

BACKGROUND OF THE INVENTION

1. Field of the Invention

The present invention relates to a method of controlling a digital image processing apparatus and a digital image processing apparatus using the method, and more particularly, to a method of controlling a digital image processing apparatus that processes and stores an input image in a recording medium and reproduces (i.e., displays) files stored in the recording medium in a reproducing mode (i.e., a stored-image display mode), and a digital image processing apparatus, for example, a digital camera or a camera-phone, using the method.

2. Description of the Related Art

A conventional image processing apparatus is disclosed in U.S. Patent Publication No. 20040119876 entitled "Method of Notification of Inadequate Picture Quality". The conventional image processing apparatus includes a recording medium, a reproducer, and a controller. The controller, for example, a digital camera processor, processes an input image and stores the processed input image in the recording medium. In a reproducing mode (hereinafter referred to as the stored-image display mode) the digital camera processor controls the reproducer to display files that are stored in the recording medium.

When a user inputs a reproduction command, the conventional image processing apparatus always reproduces the latest-stored file first. For example, an image is reproduced from an image file that has most recently been created after a photographing operation is always displayed first.

Therefore, when a user temporarily switches from the stored-image display mode to another operating mode (e.g., a photographing mode), the user has to again sequentially display files that were already displayed to find his or her most recently viewed stored image.

SUMMARY OF THE INVENTION

The present invention provides a method of controlling a digital image processing apparatus and a digital apparatus using the method which enable a user to quickly and easily reproduce (i.e., display) files stored in a recording medium.

According to an aspect of the present invention, there is provided a method of controlling a digital image processing apparatus that processes and stores an input image in a recording medium and reproduces files stored in the recording medium in a stored-image display mode. The method includes: (a) classifying the stored-image display mode into first and second modes; (b) determining whether any one of the first and second modes was selected by a user if a command to perform the stored-image display mode is input by the user; (c) displaying a latest file first if the first mode was selected; and (d) displaying a file most recently reproduced first if the second mode was selected.

According to another aspect of the present invention, there is provided a digital image processing apparatus including: a recording medium; a reproducer; and a controller. The controller processes and stores an input image in the recording medium and controlling the reproducer to display files stored in the recording medium. The stored-image display mode is classified into first and second modes. In addition, a controlling method used by the controller includes: determining whether any one of the first and second modes was selected by a user if a command to perform the stored-image display mode is input by the user; displaying a latest file first if the first mode was selected; and displaying a file most recently reproduced first if the second mode was selected.

According to a method of controlling a digital image processing apparatus and a digital image processing apparatus using the method, a user can quickly find and display desired files among files stored in a recording medium by selecting the first mode or the second mode. When the second mode is selected, if the user temporarily switches to another operating mode while sequentially displaying the files stored in the recording medium and then returns to the stored-image display mode, the user can continue to perform a previous displaying operation.

BRIEF DESCRIPTION OF THE DRAWINGS

The above and other features and advantages of the present invention will become more apparent by describing in detail exemplary embodiments thereof with reference to the attached drawings in which:

FIG. 7 is a flowchart illustrating a stored-image display mode algorithm of FIG. 3.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
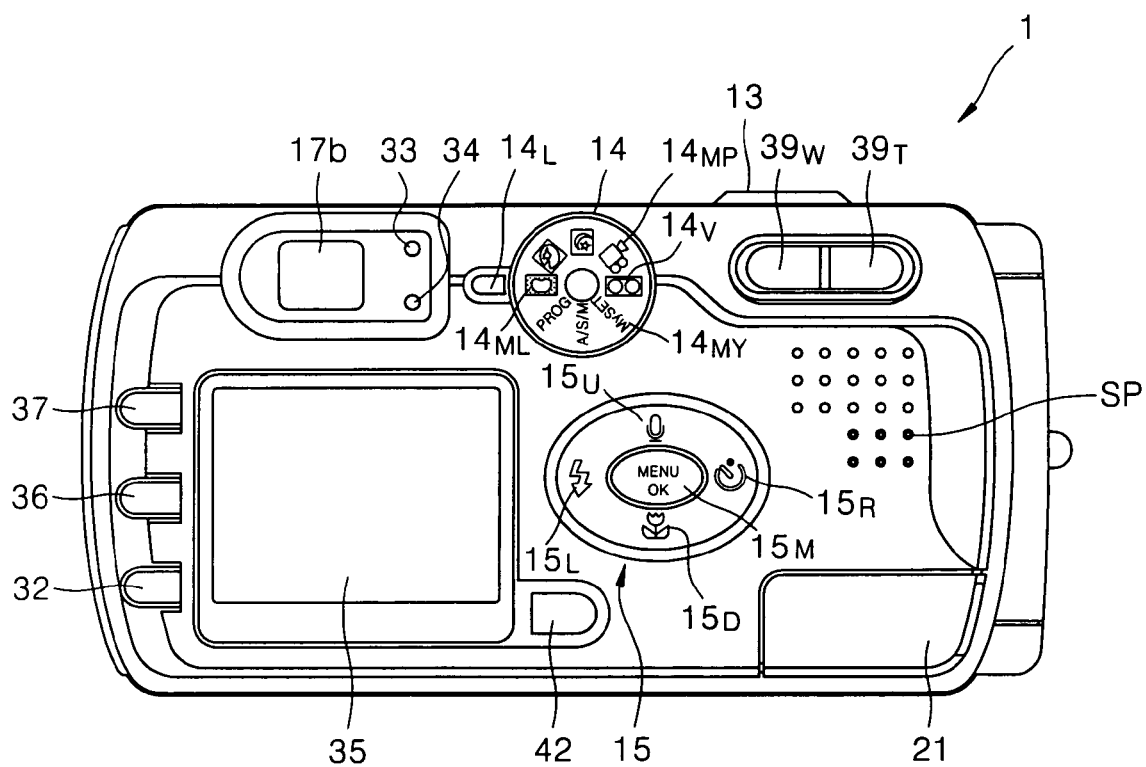
FIG. 1 is a perspective view illustrating the back of a digital camera according to an embodiment of the present invention.

Referring to FIG. 1, the front part of a digital camera 1 as a digital image processing apparatus according to the present invention includes a shutter release button 13, a mode dial 14, functional buttons 15, a manual focus/delete button 36, a manual adjust/reproduce/terminate button 37, a stored-image display mode button 42, a speaker SP, a monitor button 32, an automatic focusing lamp 33, a viewfinder 17b, a flash standby lamp 34, a color LCD panel 35, a wide-angle zoom button $39_W$, a telephoto-zoom button $39_T$, and an external interface unit 21.

The shutter release button 13 has two levels. In other words, referring to FIGS. 3 and 5, after operating the wide-angle zoom button $39_W$ and the telephoto-zoom button $39_T$, when a user lightly depresses the shutter release button 13 to a first level, a first level signal SH1 from the shutter release button 13 is turned on. When the user fully depresses the shutter release button 13 to a second level, a second level signal SH2 from the shutter release button 13 is turned on.

The mode dial 14 is used for selecting the operating modes of the digital camera 1, such as a simple photographing mode, a program photographing mode, a character photographing mode, a night view photographing mode, a manual photographing mode $14_{ML}$, a moving-image photographing mode $14_{MP}$, a user-setting mode $14_{MY}$, and a recording mode $14_V$.

The user-setting mode $14_{MY}$ is an operating mode where a user decides photograph-taking settings for each photographing mode.

The recording mode $14_V$ is for recording only sounds, for example, a user's voice. After selecting the recording mode $14_V$, when a user presses the shutter release button 13, an audio file is created in a memory card or other storage medium, and audio data is stored in the audio file. When the user presses the shutter release button 13 again, the audio data stops being stored and the audio file is set.

The functional buttons 15 are used for operating specific functions of the digital camera 1 and the functional buttons 15 are also used as control buttons to manage the movement of an active cursor that is displayed on the menu screen of the color LCD panel 35.

In a stored-image display mode, when an image currently displayed is not enlarged, if the user presses a self-timer/right button $15_R$, a next file in a forward direction is displayed. When the image currently displayed is enlarged in the stored-image display mode, if the user presses the self-timer/right button $15_R$, a display region of the enlarged image is moved to the right. In a preview mode, if the user presses the self-timer/right button $15_R$, a self-timer operation, e.g., automatic photographing after 10 seconds, is performed.

In the stored-image display mode, when the image currently displayed is not enlarged, if the user presses a flash/left button $15_L$, a next file in a reverse direction is displayed. When the image currently displayed is enlarged, if the user presses the flash/left button $15_L$, the display region of the enlarged image is moved to the left.

In a preview mode, if the user presses the flash/left button $15_L$, any one of the flash modes for a photographing mode is set.

In the stored-image display mode, when the image currently displayed is enlarged, if the user presses a macro/down button $15_D$, the display region of the enlarged image is moved down. In the preview mode, the user may set automatic proximity focusing by pressing the macro/down button $15_D$.

In the stored-image display mode, when the image currently displayed is enlarged, if the user presses a voice-memo/up button $15_U$, the display region of the enlarged image is moved up. In the preview mode, if the user presses the voice-memo/up button $15_U$, a 10 second recording is possible upon consecutive photographing.

In a setting mode from the preview mode, if the user presses a menu/select-confirm button $15_M$ when the active cursor is on a selection menu, an operation condition corresponding to the selection menu is set.

The manual adjust/reproduce/terminate button 37 is used for manual adjustment of specific conditions. In the stored-image display mode, when the user presses the manual adjust/reproduce/terminate button 37, a selected moving-image file may be reproduced or its reproduction may be terminated.

The manual focus/delete button 36 is used for manual focusing or deleting in the photographing mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the stored-image display mode, when the user presses the monitor button 32 while an image file is being reproduced, photographing information about the image file is displayed on the color LCD panel 35. When the user presses the monitor button 32 again, only images are displayed.

The stored-image display mode button 42 is used for switching between the stored-image display mode and the preview mode.

Figure 2:
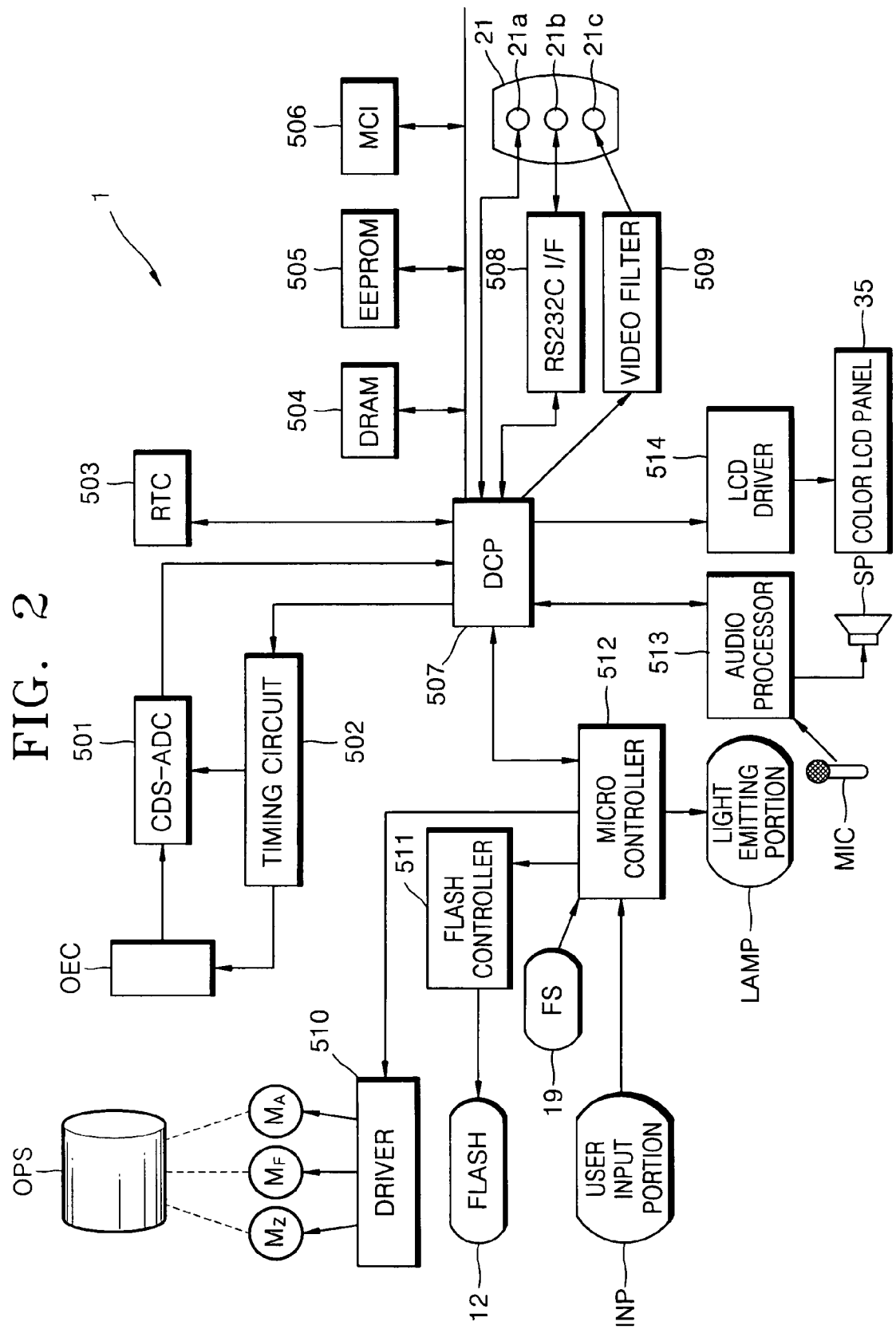
FIG. 2 is a block diagram illustrating an example configuration of components of the digital camera of FIG. 1.

The automatic focusing lamp 33 operates when a focus is well adjusted. The flash standby lamp 34 operates when a flash 12 of FIG. 2 is in a standby mode. A mode indicating lamp $14_L$ indicates a selection mode of the mode dial 14.

FIG. 2 is a schematic diagram of the entire configuration of the digital camera 1 of FIG. 1. The entire configuration and operation of the digital camera 1 of FIG. 1 will now be described with reference to FIGS. 1 through 2.

An optical system (OPS) including a lens unit and a filter unit optically processes light from a subject. The lens unit of the OPS includes a zoom lens, a focal lens, and a compensation lens.

When a user presses the wide angle-zoom button $39_W$ or the telephoto-zoom button $39_T$ included in a user input portion (INP), a signal corresponding to the wide angle-zoom button $39_W$ or the telephoto-zoom button $39_T$ is relayed to a micro-controller 512. The micro-controller 512 controls a driver 510, thereby running a zoom motor $M_Z$, which in turn, moves the zoom lens. In other words, when the user presses the wide angle-zoom button $39_W$, the focal length of the zoom lens becomes short, thereby widening the angle of view. When the user presses the telephoto-zoom button $39_T$, the focal length of the zoom lens becomes long, thereby narrowing the angle of view. Since the position of the focus lens is adjusted in a state where the position of the zoom lens is set, the angle of view is hardly affected by the position of the focus lens.

In an automatic focusing mode, a main controller built into a digital camera processor (DCP) 507 controls the driver 510 through the micro-controller 512, thereby driving a focus motor $M_F$. Accordingly, when the focal lens is moved, the position of the focal lens, for example, a number of driving steps of the focus motor $M_F$, having a largest high frequency component of an image signal is set.

The compensation lens in the lens unit of the OPS is not separately operated because the compensation lens compensates for the entire refractive index. Reference numeral $M_A$ indicates a motor for driving an aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise therefrom, adjusts an amplitude thereof, and then converts the analog signal into a digital signal.

A real time clock (RTC) 503 provides time information to the DCP 507. The DCP 507 processes the digital signal from the CDS-ADC 501 and generates a digital image composed of luminance and chromaticity values.

A light emitting portion (LAMP) is operated by the microcontroller 512 in response to a control signal generated by the DCP 507 including the main controller. The light emitting portion (LAMP) includes a self-timer lamp (not shown), the automatic focusing lamp 33, the mode indicating lamp $14_L$, and the flash standby lamp 34. The user input portion INP includes the shutter release button 13, the mode dial 14, the functional buttons 15, the monitor button 32, the manual focus/delete button 36, the manual adjust/reproduce/terminate button 37, the wide angle-zoom button $39_W$, and the telephoto-zoom button $39_T$.

A dynamic random access memory (DRAM) 504 temporarily stores a digital image signal from the DCP 507. An electrically erasable and programmable read only memory (EEPROM) 505 stores algorithms and setting data. A user's memory card is inserted into or removed from a memory card interface (MCI) 506. The digital image signal from the DCP 507 is input to an LCD driver 514, thereby displaying an image on the color LCD panel 35.

The digital image signal from the DCP 507 can be transmitted via a universal serial bus (USB) connector 21a or via an RS232C interface 508 and an RS232C connector 21b for serial communications. The digital image signal from the DCP 507 can also be transmitted via a video filter 509 and a video output unit 21c as a video signal.

An audio processor 513 can relay sound from a microphone MIC to the DCP 507 or to speaker SP. In addition, the audio processor 513 can output an audio signal from the DCP 507 to the speaker SP. The micro-controller 512 controls the operation of a flash controller 511 in response to a signal from a flash-luminance sensor 19, thereby driving the flash 12.

A main algorithm of the DCP 507 of FIG. 2 will be now described with reference to FIGS. 1 through 3.

When power is applied to the digital camera 1, the DCP 507 is initialized (S1). After the initialization (S1), the DCP 507 performs the preview mode (S2). In the preview mode, an input image is displayed on the color LCD panel 35. An operation related to the preview mode will be described in detail later with reference to FIG. 4.

When a user lightly depresses the shutter release button 13 to the first level and the first level signal SH1 from the shutter release button 13 is turned on (S3), the DCP 507 performs a current photographing mode (S4). The photographing mode (S4) algorithm will be described in detail with reference to FIG. 5.

When INP generated signals corresponding to a setting mode are input (S5), the setting mode for setting an operating condition in response to the input signals from the INP is performed (S6). When a termination signal is not generated in step S7, the DCP 507 continues to perform the following operations.

When a signal is generated by the stored-image display mode button 42 in the user input portion INP (S8), the stored-image display mode is performed (S9). In the stored-image display mode, the DCP 507 performs a reproduction operation in response to the input signals from the user input portion INP.

The stored-image display mode is classified into a default mode being a first mode and a continuous mode being a second mode. In the setting mode (S6), the user can select the default reproduction mode or the continuous reproduction mode. If the default reproduction mode is selected, a file that is created most recently is displayed first. If the continuous reproduction mode is selected, a file reproduced most recently is reproduced first.

Accordingly, the user can quickly find and display desired files among files stored in a recording medium, for example, the memory card, by selecting the first mode or the second mode. When the continuous mode as the second mode is selected, if the user temporarily switches to another operating mode while sequentially displaying the files stored in the recording medium and then returns to the stored-image display mode, the user can continue to perform a previous displaying operation. That is, in the continuous mode, the user can continue reviewing stored images at the point where he or she left off before switching to another operating mode. As such, in the continuous mode the user can essentially "bookmark," "flag," or otherwise identify a last-viewed image so that he or she is not inconvenienced with having to find the last-viewed image from a plurality of stored images. The stored-image display mode algorithm (S9) will be described with reference to FIGS. 6 and 7. When the stored-image display mode is terminated, the above operations (i.e., operations S2-S9) are repeated.

Figure 4:
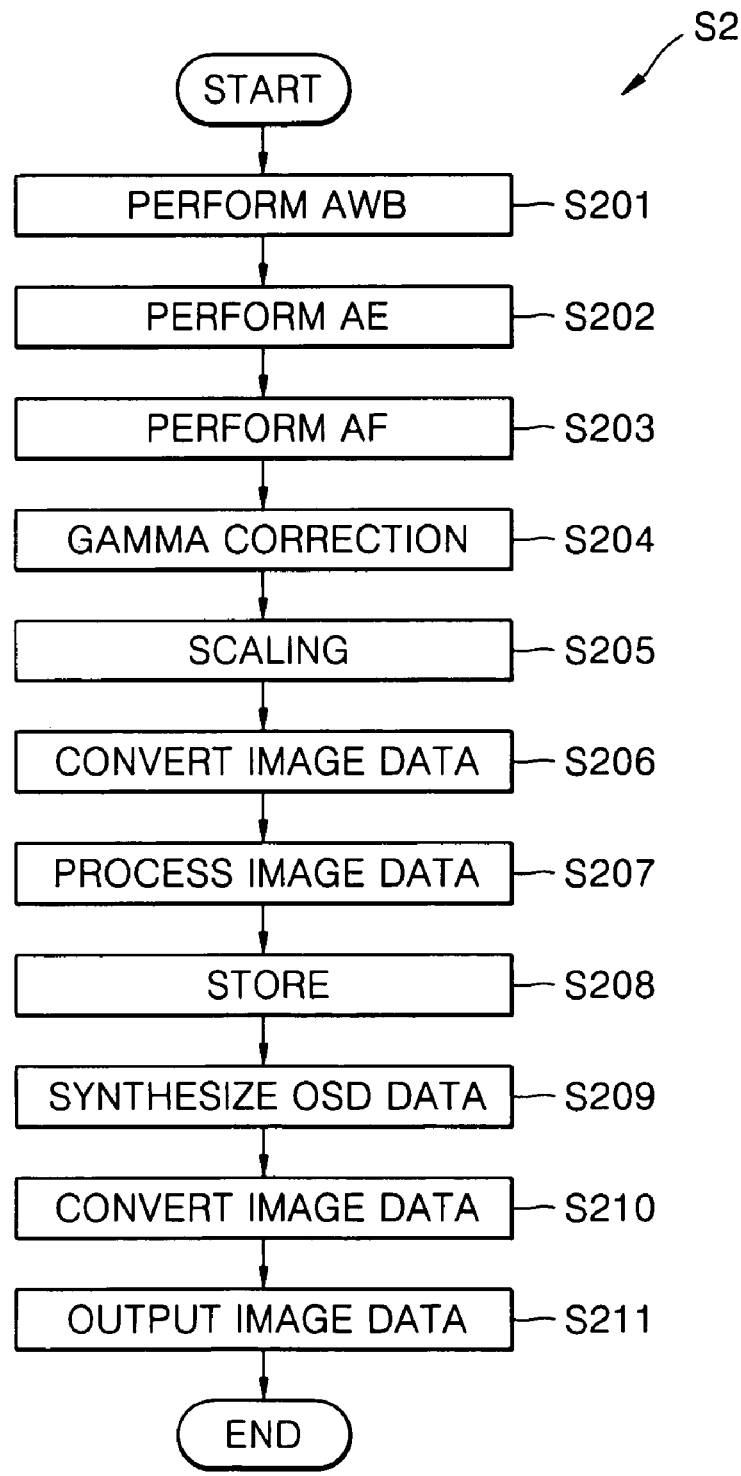
FIG. 4 is a flowchart illustrating a preview mode algorithm of FIG. 3.

The preview mode (S2) algorithm will now be described with reference to FIGS. 1, 2, and 4.

The DCP 507 performs automatic white balancing (AWB) and sets parameters related to the white balance (S201). The DCP 507 performs automatic exposure (S202). The DCP 507 calculates the incident brightness, drives an aperture driving motor $M_A$ according to the calculated incident brightness, and sets an exposure time. Then, the DCP 507 performs automatic focusing (S203).

The DCP 507 performs gamma correction on input image data (S204) and scales the gamma corrected image data to meet display standards (S205). The DCP 507 converts the scaled input image data from an RGB (red, green, and blue) format into a luminance-chromaticity format (S206). The DCP 507 processes the input image data depending on resolution and where the input image data is displayed and filters the input image data (S207).

Figure 3:
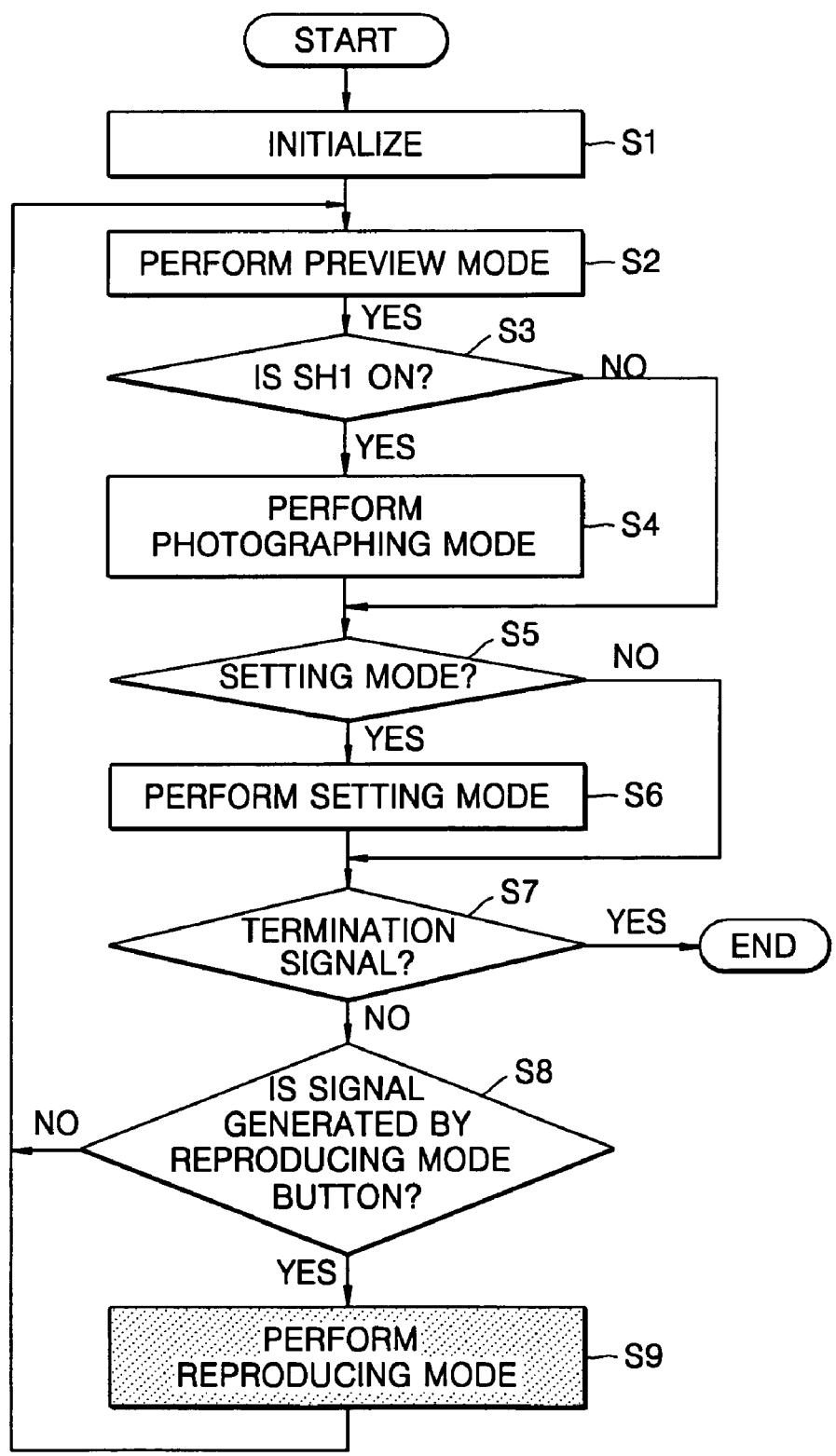
FIG. 3 is a flowchart illustrating a main algorithm of a digital camera processor (DCP) illustrated in FIG. 2.

The DCP 507 temporarily stores the input image data in the DRAM 504 of FIG. 3 (S208). The DCP 507 synthesizes the data temporarily stored in the DRAM 504 of FIG. 3 and on-screen display (OSD) data (S209). The DCP 507 converts the synthesized image data from the RGB format into the luminance-chromaticity format (S210) and outputs the image data in the converted format via the LCD driver 514 of FIG. 3 (S211).

Figure 5:
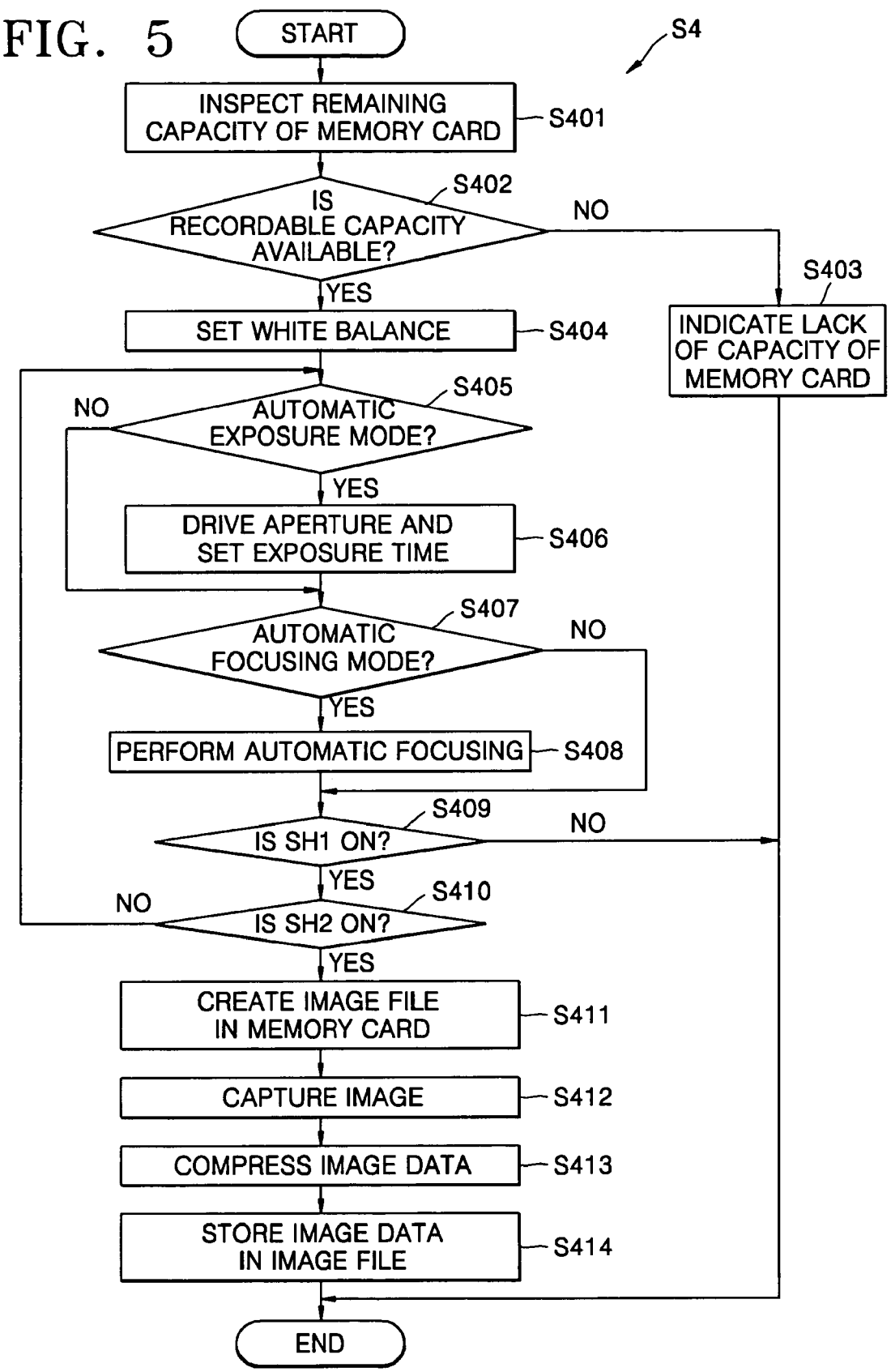
FIG. 5 is a flowchart illustrating a photographing mode algorithm of FIG. 3.

FIG. 5 is a flowchart illustrating the photographing mode (S4) algorithm of FIG. 3. The photographing mode (S4) algorithm of FIG. 3 will now be described with reference to FIGS. 1, 2, and 5. Here, the current position of the zoom lens is already set.

The DCP 507 inspects the remaining capacity of the memory card (S401) and determines whether the memory card has enough capacity to store a digital image signal (S402). If the memory card does not have enough storage capacity, the DCP 507 indicates the lack of capacity of the memory card and ends the photographing mode (S403). If the memory card has enough storage capacity, the following operations are performed.

The DCP 507 sets white balance and parameters related to the white balance according to a present photographing condition (S404). In the automatic exposure mode (S405), the DCP 507 calculates the exposure by measuring incident luminance, drives the aperture driving motor $M_A$ according to the calculated exposure, and sets the exposure time (S406). In the automatic focusing mode (S407), the DCP 507 performs automatic focusing and drives the focal lens (S408).

When the first level signal SH1 from the shutter release button 13 is on (S409), the DCP 507 performs the following operations.

The DCP 507 identifies whether the second level signal SH2 is on (S410). When the second level signal SH2 is not on, it means that the user did not press the shutter release button 13 to the second level to take a photograph. Then, the DCP 507 repeats S405 through S410.

When the second level signal SH2 is on, it means that the user fully depressed the shutter release button 13 to the second level. Then, the DCP 507 creates an image file in the memory card as a storage medium (S411). Next, the DCP 507 captures an image (S412). In other words, the DCP 507 receives still-image data from the CDS-ADC 501. Then, the DCP 507 compresses the received still-image data (S413). The DCP 507 stores the compressed still-image data in the image file (S414).

Figure 6:
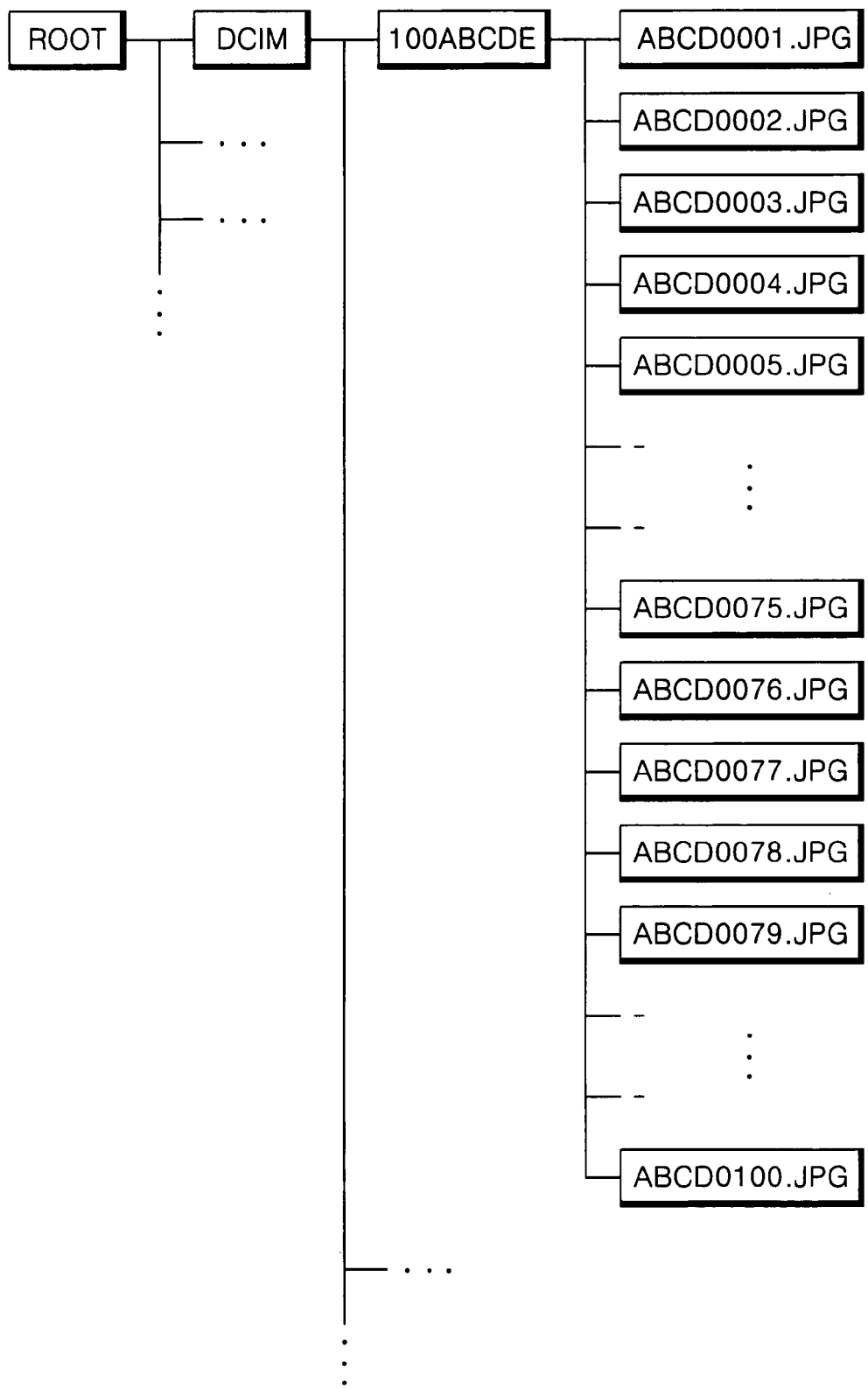
FIG. 6 illustrates files stored in a memory card as a recording medium after the photographing mode algorithm of FIG. 5 is performed.

FIG. 6 illustrates files stored in the memory card, i.e., the recording medium, after the photographing mode (S4) algorithm of FIG. 5 is performed.

Referring to FIG. 6, the memory card is formatted in a tree structure with a "ROOT" directory at the top and a "DCIM" directory for storing data files of a user under the "ROOT" directory.

A "100ABCDE" directory for storing all files created after the user performs a photographing operation is formed under the "DCIM" directory. Here, the name of the directory, i.e., "100ABCDE," contains a directory index, "100," and a unique code, "ABCDE." The unique code, "ABCDE," is arbitrarily set when a digital image processing apparatus, such as a digital camera, is manufactured.

In the "100ABCDE" directory, all files created after the user performs the photographing operation are sequentially stored. Here, files names, each of which is a combination of the unique code, "ABCD," and a file index given in order of file creation, are created. For example, a file named "ABCD0001.JPG" was created first and a file named "ABCD0100.JPG" was created most recently.

FIG. 7 is a flowchart illustrating the stored-image display mode (S9) algorithm of FIG. 3. As described above, the stored-image display mode is classified into the default mode as the first mode and the continuous mode as the second mode. Accordingly, a user can select the default mode or the continuous mode in the setting mode (S6).

The stored-image display mode (S9) algorithm of FIG. 3 will now be selectively described with reference to FIGS. 1, 2, 6, and 7.

In the initial stored-image display mode, the DCP 507 determines whether a user selected the continuous mode (S901). If the continuous mode was not selected, the DCP 507 reproduces a file that was most recently created, for example, "ABCD0100.JPG" first (S904 and S905). If the continuous mode was selected, the DCP 507 reproduces a file that was most recently reproduced, for example, "ABCD0075.JPG," first (S903 and S905).

Accordingly, the user can quickly find and display desired files among files stored in a recording medium, for example, a memory card, by selecting the first mode or the second mode. When the continuous mode as the second mode is selected, if the user temporarily switches to another operating mode while sequentially displaying the files stored in the recording medium and then returns to the stored-image display mode, the user can continue to perform a previous displaying operation.

The DCP 507 reproduces a file selected according to an input signal from the user in each of the default mode and the continuous mode (S912). For example, the DCP 507 controls the LCD driver 514 to display an image of the selected file on the color LCD panel 35. Here, the DCP 507 sets a reproduction file index using an index of the file selected according to a left or right signal that the user generated by pressing the flash/left button $15_L$ or the self-timer/right button $15_R$ (S908 or S911). Next, the DCP 507 reproduces a file indicated by the reproduction file index (S912).

The stored-image display mode (S9) algorithm of FIG. 3 will now be sequentially described with reference to FIGS. 1, 2, 6, and 7. When the stored-image display mode starts, the DCP 507 determines whether a user selected any one of the default mode and the continuous mode (S901). If the continuous mode was not selected, the DCP 507 sets a reproduction file index using an index of a latest, that is, most recently created, file (S904). For example, if file "ABCD0100.JPG" is the file containing the most-recently photographed image, in the default mode, the DCP 507 sets the reproduction file index to "100-0100", wherein "100" identifies the "100ABCDE" directory and "0100" identifies the file in the foregoing directory. Next, the DCP 507 reproduces a file indicated by the reproduction file index (S905).

If the continuous mode was selected, the DCP 507 determines whether the reproduction file index is in a reset state, i.e., "0" (S902).

When the stored-image display mode is performed for the first time after the digital camera 1 is turned on, the reproduction file index is in the reset state. If the reproduction file index is in the reset state, the DCP 507 sets the reproduction file index using an index of a latest file (S904). Then, the DCP 507 reproduces a file indicated by the reproduction file index (S905). In other words, when the digital camera 1 performs the stored-image display mode for the first time after turned on, even if the continuous mode was set, the DCP 507 reproduces a latest file, for example, "ABCD0100.JPG," first (S902, S904, and S905).

If the reproduction file index is not in the reset state, the DCP 507 determines whether a file indicated by the reproduction file index exists in the memory card, i.e., the recording medium (S903). Such an operation is required since, if the memory card is replaced with a new memory card, the file indicated by the reproduction file index may not exist in the new memory card.

If the file indicated by the reproduction file index does not exist in the memory card, the DCP 507 sets the reproduction file index to, for example, "100-0100," using an index of a latest file, for example, "ABCD0100.JPG," and reproduces the "ABCD0100.JPG" file indicated by the reproduction file index (S903 through S905).

If the file indicated by the reproduction file index exists in the memory card, the DCP 507 reproduces the file (S903 and S905). In other words, if the continuous mode was selected, the DCP 507 reproduces a file most recently reproduced, for example, "ABCD0075.JPG," first.

When the left signal is input after the user presses the flash/left button $15_L$ (S906), the DCP 507 determines whether a file corresponding to the left signal exists (S907). In this case, the file corresponding to the left signal denotes the last of files created before the file indicated by the reproduction file index. If the file corresponding to the left signal exists, the DCP 507 sets the reproduction file index using an index of the file (S908). Then, the DCP 507 reproduces a file indicated by the reproduction file index (S912).

When the right signal is input after the user presses the self-timer/right button $15_R$ (S909), the DCP 507 determines whether a file corresponding to the right signal exists (S910). In this case, the file corresponding to the right signal denotes the last of files created before the file indicated by the reproduction file index. If the file corresponding to the left signal exists, the DCP 507 sets the reproduction file index using an index of the file (S908). Then, the DCP 507 reproduces a file indicated by the reproduction file index (S912).

Operations S906 through S913 are repeated until the stored-image display mode is terminated in response to a signal generated by the stored-image display mode button 42.

As described above, according to a method of controlling a digital image processing apparatus and a digital image processing apparatus using the method, a user can quickly find and reproduce desired files among files stored in a recording medium, for example, a memory card, by selecting a default mode or a continuous mode. When the continuous mode is selected, if the user temporarily switches to another operating mode while sequentially displaying the files stored in the recording medium and then returns to the stored-image display mode, the user can continue to perform a previous displaying operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital image processing apparatus that, in a photographing mode, processes and stores an input image in a recording medium and, in a reproduction mode, displays at least one image file of a plurality of image files that are stored in the recording medium, the method consisting of the sequential steps:

(a) setting the digital image processing apparatus in the reproduction mode;

(b) using the digital image processing apparatus in the reproduction mode for displaying a single image file from the recording medium, the single image file being different from a most-recently stored image file;

(c) while the single image file is being displayed, switching from the reproduction mode to the photographing mode;

(d) using the digital image processing apparatus for a duration in the photographing mode for storing a newly photographed image to a new image file in the recording medium;

(e) after the duration, switching from the photographing mode to the reproduction mode; and (f) irrespective of the duration, first displaying again only the single image file from step (c).

2. The method of claim 1 wherein step (c) comprises the step of identifying the image file that is being displayed.

3. The method of claim 2 wherein the identifying step comprises setting in a memory of the digital image processing apparatus an index value of the single image file that is being displayed.

4. The method of claim 3 wherein step (e) comprises the step of reading the memory to retrieve the index value.

5. The method of claim 1 wherein step (e) comprises the steps of:

determining if the single image file from step (c) exists in the recording medium; and if the single image file from step (c) is determined to not exist in the recording medium, displaying another single image file preceding or following the single image file from step (c), the another single image file being different from the most-recently stored image file.

6. The method of claim 2 wherein the identifying step comprises one of setting a flag and setting a bookmark on the single image file that is being displayed in step (c).

7. The method of claim 3 wherein step (b) comprises the steps of:

sequentially displaying single image files of the plurality; and updating the index value stored in the memory of the digital image processing apparatus each time a currently-displayed image file is changed.

8. The method of claim 4 wherein the reading step comprises the step of determining if the index value is in a reset state.

9. The method of claim 8 wherein the reading step comprises after the determining step, first displaying a most-recently stored image file from the recording medium if the index value is determined to be in the reset state.

10. A digital image processing apparatus comprising:

an optical system for receiving a light reflected from a subject;

a photoelectric conversion module in optical communication with the optical system for converting the light to image data;

a recording medium for storing the image data in an image file;

a display screen for displaying the image data; and a controller connected with the photoelectric conversion module, the recording medium and the display screen, the controller being operative in a photographing mode to process the image data for storage in the recording medium and, in a stored-image display mode, being operative to control the display screen for displaying a single image relative to the image data, wherein upon a user performing a mode-switching operation defined by switching from the stored-image display mode to the photographing mode and back to the stored-image display mode the controller causes the display screen to first display a single image file that was most recently displayed before the mode-switching operation, the single image file being different from a most-recently stored image file, and the single image file being first displayed irrespective of a duration that the camera was used in the photographing mode during the mode-switching operation.

11. The digital image processing apparatus of claim 10 wherein the controller is operative to identify the single image file that was most recently displayed in the stored-image display mode.

12. The digital image processing apparatus of claim 10 wherein each image file stored in the recording medium includes a unique file index value and the controller causes the unique file index value of the single image file that was most recently displayed in a file index memory to be stored.

13. The digital image processing apparatus of claim 12 wherein the controller comprises at least one of a digital camera processor and a microcontroller.

14. The digital image processing apparatus of claim 13 further comprising a user input including a mode-switching actuator for switching the controller between the stored-image display mode and the photographing mode.

15. The digital image processing apparatus of claim 14 wherein the user input further comprises at least one directional actuator for displaying a previous and a next image file in the stored-image display mode, the controller updating the file index memory with a different unique file index value each time the at least one directional actuator is pressed.

16. The digital image processing apparatus of claim 14 wherein the controller is operative to read the memory for retrieving the file index value in response to the mode-switching actuator being pressed when switching the controller from the photographing mode to the stored-image display mode.

* * * * *